(12) United States Patent
Kallio et al.

(10) Patent No.: US 10,089,774 B2
(45) Date of Patent: Oct. 2, 2018

(54) TESSELLATION IN TILE-BASED RENDERING

(75) Inventors: Kiia Kaappoo Kallio, Inkoo (FI); Jukka-Pekka Arvo, Raisio (FI)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 13/298,051

(22) Filed: Nov. 16, 2011

(65) Prior Publication Data

US 2013/0120380 A1    May 16, 2013

(51) Int. Cl.
*G06T 15/30*     (2011.01)
*G06T 17/20*     (2006.01)
*G06T 15/00*     (2011.01)

(52) U.S. Cl.
CPC .................................. *G06T 15/005* (2013.01)

(58) Field of Classification Search
CPC .............................. G06T 17/20; G06T 17/205
USPC .......................................................... 345/423
See application file for complete search history.

(56) References Cited

U.S. PATENT DOCUMENTS

| 6,697,063 | B1 | 2/2004 | Zhu | |
| 7,170,515 | B1 | 1/2007 | Zhu | |
| 7,388,581 | B1 * | 6/2008 | Diard et al. | 345/421 |
| 7,692,648 | B2 | 4/2010 | Engel | |
| 7,847,798 | B1 * | 12/2010 | Parenteau et al. | 345/422 |
| 8,203,564 | B2 | 6/2012 | Jiao et al. | |
| 8,289,319 | B2 * | 10/2012 | Nordlund et al. | 345/422 |
| 8,643,644 | B2 | 2/2014 | Wei et al. | |
| 2002/0063708 | A1 | 5/2002 | Senda et al. | |
| 2005/0057564 | A1 * | 3/2005 | Liao et al. | 345/422 |
| 2007/0146378 | A1 * | 6/2007 | Sorgard et al. | 345/581 |
| 2007/0273689 | A1 * | 11/2007 | Tsao | 345/422 |

(Continued)

FOREIGN PATENT DOCUMENTS

| CN | 102096907 A | 6/2011 |
| CN | 102265309 A | 11/2011 |

(Continued)

OTHER PUBLICATIONS

L. Seiler, D. Carmean, E. Sprangle, T. Forsyth, M. Abrash, P. Dubey, S. Junkins, A. Lake, J. Sugerman, R. Cavin, R. Espasa, E. Grochowski, T. Juan, and P. Hanrahan. Larrabee: a many-core x86 architecture for visual computing. ACM Transactions on Graphics, 27(3):1-15, 2008.*

(Continued)

*Primary Examiner* — Jin Ge
(74) *Attorney, Agent, or Firm* — Shumaker & Sieffert, P.A.

(57) ABSTRACT

The disclosed techniques includes generating an input visibility stream for each tile of a frame, the input visibility stream indicating whether or not an input primitive is visible in each tile when rendered, and generating an output visibility stream for each tile of the frame, the output visibility stream indicating whether or not an output primitive is visible in each tile when rendered, wherein the output primitive is produced by tessellating the input primitive. In this way, based on the input visibility stream, tessellation may be skipped for entire input primitive that is not visible in the tile. Also, based on the output visibility stream, tessellation may be skipped for certain ones of the output primitives that are not visible in the tile, even if some of the input primitive is not visible.

40 Claims, 13 Drawing Sheets

(56) References Cited

U.S. PATENT DOCUMENTS

| | | | |
|---|---|---|---|
| 2009/0058848 | A1 | 3/2009 | Howson |
| 2009/0295800 | A1 | 12/2009 | Vetter et al. |
| 2010/0026682 | A1 | 2/2010 | Plowman et al. |
| 2011/0080406 | A1 | 4/2011 | Hakura et al. |
| 2011/0141112 | A1 | 6/2011 | Hux et al. |
| 2011/0221743 | A1* | 9/2011 | Keall et al. ............ 345/419 |
| 2011/0267346 | A1* | 11/2011 | Howson ............ 345/423 |
| 2011/0304608 | A1 | 12/2011 | Yang |
| 2011/0310102 | A1* | 12/2011 | Chang ............ 345/423 |
| 2012/0096474 | A1* | 4/2012 | Jiao ............ 718/107 |
| 2012/0212488 | A1* | 8/2012 | Yu et al. ............ 345/422 |

FOREIGN PATENT DOCUMENTS

| | | |
|---|---|---|
| GB | 2480012 A | 11/2011 |
| JP | 2002163665 A | 6/2002 |
| JP | 2009295162 A | 12/2009 |
| WO | 2008101210 A2 | 8/2008 |
| WO | 2009117619 A1 | 9/2009 |
| WO | 2010073017 A1 | 7/2010 |

OTHER PUBLICATIONS

D. D Cohen-Or, Y. Chrysanthou, and C. Silva. A survey of visibility for walkthrough applications. SIGGRAPH Course Notes # 30, 2001.*

Blythe D.: The Direct3D 10 system. ACM Trans. Graph. 25(3):724-734, Aug. 2006.*

T. Aila, V. Miettinen, and P. Nordlund, "Delay Streams for Graphics Hardware," ACM Trans. Graphics, vol. 22, No. 3, pp. 792-800, Jul. 2003.*

Abraham et al., "A load-balancing strategy for sort-first distributed rendering," Computer Graphics and Image Processing, Proceedings of the 17th Brazilian Symposium on Computer Graphics and Image Processing, Oct. 17-20, 2004, 8 pp.

International Search Report and Written Opinion From PCT/US2012/060368—ISA/EPO, dated Jan. 15, 2013, 11 pp.

International Preliminary Report on Patentability from corresponding PCT Application Serial No. PCT/US2012/060368 dated Mar. 3, 2014 (24 pages).

Second Written Opinion from corresponding PCT Application Serial No. PCT/US2012/060368 dated Nov. 5, 2013 (6 pages).

* cited by examiner

**VISIBILITY STREAM
(TESSELLATION ONLY)**                                                          ← 104

Patch A

| 1 | 1 | 0 | 1 | 1 | 1 | 1 | 0 | 1 |
|---|---|---|---|---|---|---|---|---|

Triangle Triangle Triangle Triangle Triangle Triangle Triangle Triangle Triangle
0              1              2              3              4              5              6              7              N

**VISIBILITY STREAM (TESSELLATION AND
GEOMETRY SHADER ENABLED)**                                                ← 104'

Patch A'

| 1 | 1 | 0 | 1 | 1 | 1 | 1 | 0 | 1 | 1 | 1 | 1 |
|---|---|---|---|---|---|---|---|---|---|---|---|

Triangle Triangle Triangle Triangle Triangle Triangle Triangle Triangle Triangle Triangle Triangle Triangle
0              1              2              3              4              5              6              7              8              9              10            NxM

FIG. 9

TESSELLATION IN TILE-BASED RENDERING

TECHNICAL FIELD

This disclosure relates to techniques for graphics processing, and more specifically to techniques for tessellation when using a tile-based rendering architecture.

BACKGROUND

Visual content for display, such as content for graphical user interfaces and video games, may be generated by a graphics processing unit (GPU). A GPU may convert two-dimensional or three-dimensional (3D) objects into a two-dimensional (2D) pixel representation that may be displayed. Converting information about 3D objects into a bit map that can be displayed is known as pixel rendering, and requires considerable memory and processing power. In the past, 3D graphics capability was available only on powerful workstations. However, now 3D graphics accelerators are commonly found in personal computers (PC), as well as in in embedded devices, such as smart phones, tablet computers, portable media players, portable video gaming consoles, and the like. Typically, embedded device have less computational power and memory capacity as compared to conventional PCs. As such, increased complexity in 3D graphics rendering techniques presents difficulties when implementing such techniques on an embedded system.

SUMMARY

In general, this disclosure describes techniques for graphics processing, and in particular, techniques for graphics processing in a computing device having a tile-based graphics processing architecture utilizing tessellation. This disclosure proposes the generation of output and/or input visibility streams that indicate the visibility of graphics primitives in a tile of a frame. Such visibility streams allow the tile-based graphics processing architecture to skip rendering of graphics primitives that are not visible in the frame. In this way, unnecessary processing may be avoided, thus improving performance.

In one example of the disclosure, a method for tessellation in a tile-based graphics is proposed. The method includes generating an input visibility stream for each tile of a frame, the input visibility stream indicating whether or not an input primitive is visible in each tile when rendered, and generating an output visibility stream for each tile of the frame, the output visibility stream indicating whether or not an output primitive is visible in each tile when rendered, wherein the output primitive is produced by tessellating the input primitive.

In another example of the disclosure, an apparatus configured to perform tessellation in a tile-based graphics rendering pipeline is proposed. The apparatus includes a binning pipeline configured to generate an input visibility stream for each tile of a frame. The input visibility stream indicates whether or not an input primitive is visible in each tile when rendered. The binning pipeline is further configured to generate an output visibility stream for each tile of the frame. The output visibility stream indicates whether or not an output primitive is visible in each tile when rendered, wherein the output primitive is produced by tessellating the input primitive.

In another example of the disclosure, a method for tessellation in a tile-based rendering pipeline is proposed. The method includes generating a visibility stream for each input primitive for each tile of a frame, the visibility stream having a length of N bits, wherein each bit indicates whether or not an output primitive is visible in each tile when rendered, and wherein the output primitive is produced by tessellating the input primitive.

In another example of the disclosure, an apparatus configured to perform tessellation in a tile-based rendering pipeline is proposed. The apparatus includes a binning pipeline configured to generate a visibility stream for each input primitive for each tile of a frame, the visibility stream having a length of N bits, wherein each bit indicates whether or not an output primitive is visible in each tile when rendered, and wherein the output primitive is produced by tessellating the input primitive.

The details of one or more examples are set forth in the accompanying drawings and the description below. Other features, objects, and advantages will be apparent from the description and drawings, and from the claims.

BRIEF DESCRIPTION OF DRAWINGS

FIG. 9 is a conceptual diagram illustrating an example single visibility stream.

DETAILED DESCRIPTION

This disclosure relates to techniques for graphics processing, and more specifically to techniques for tessellation when using a tile-based rendering architecture.

Some graphics rendering pipelines, including Microsoft's DirectX11 (DX11) application programming interface (API), include additional processing stages that allow for tessellation of graphics primitives. Tessellation is the process by which graphics primitives are divided into smaller graphics primitives, thus allowing for finer detail in the displayed image.

Figure 1:
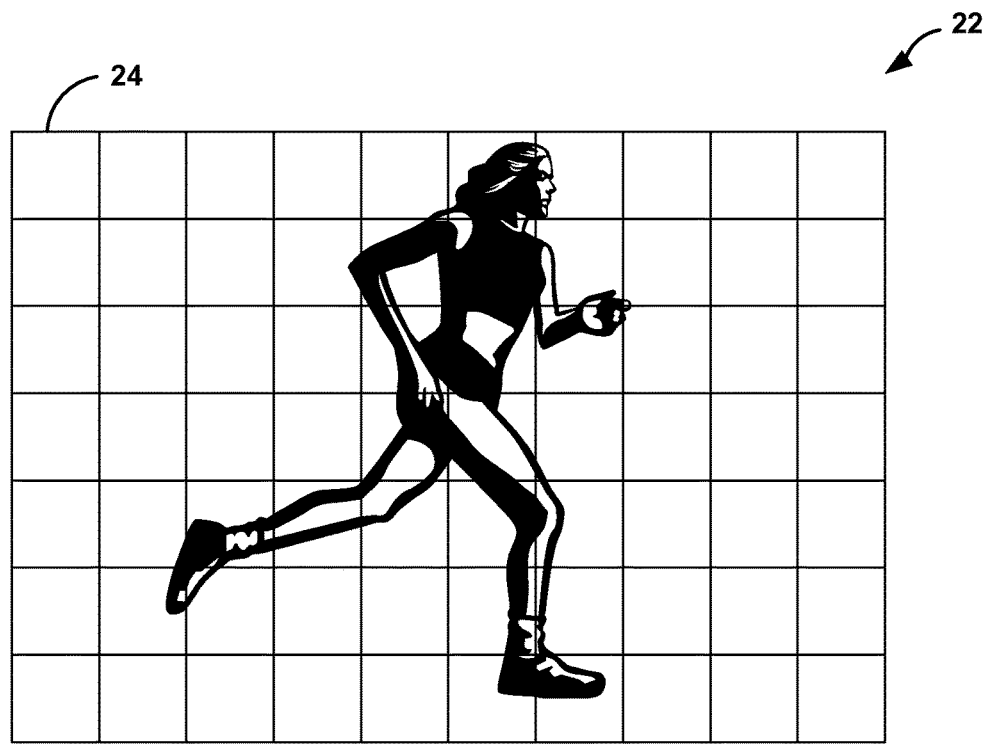
FIG. 1 is a conceptual diagram illustrating tiles of a frame in a tile-based rendering architecture.

A reference implementation with a tessellator stage is well-defined by a Microsoft DX11 software reference rasterizer, but such an implementation does not map very efficiently to a tile-based rendering architecture, such as that used in graphics processors in embedded devices (e.g., tablet computers, mobile phones, mobile gaming devices, mobile media players, etc.). Tile-based rendering (sometimes referred to as binning) renders one frame of a 3D scene by breaking the frame into smaller parts (e.g., rectangular tiles) and rendering each of these parts separately. Tile-based rendering is useful for applications where little dedicated graphics memory is available, such as for mobile applications. FIG. 1 is a conceptual diagram illustrating tiles of a frame in a tile-based rendering architecture. Frame 22 may be divided into a plurality of tiles, such as tile 24. Graphics processing is then performed on a per-tile basis to render the entire frame.

Conventional techniques for rendering graphics data with a tessellation stage, including the Microsoft DX11 software reference rasterizer, are designed with the assumption that the entire frame of the 3D scene will be rendered as a whole. As such, the tessellation algorithm used in such reference rasterizers always tessellates a full input primitive to a full set of output primitives. In a tile-based rendering architecture, this can cause a lot of irrelevant graphics processing unit (GPU) and tessellation processing as only part of the tessellated output primitives may actually contribute to the currently rendered tile (i.e., some the output primitives will be outside the currently rendered tile in another tile).

In this view, this disclosure proposes a method and apparatus for tessellation in a tile-based graphics rendering architecture. The disclosed techniques includes generating an input visibility stream for each tile of a frame, the input visibility stream indicating whether or not an input primitive is visible in each tile when rendered, and generating an output visibility stream for each tile of the frame, the output visibility stream indicating whether or not an output primitive is visible in each tile when rendered, wherein the output primitive is produced by tessellating the input primitive. In this way, based on the input visibility stream, tessellation may be skipped for an entire input primitive that is not visible in the tile. Also, based on the output visibility stream, tessellation may be skipped for certain ones of the output primitives that are not visible in the tile, even if some of the input primitive is not visible. As such, unnecessary tessellation if avoided. Furthermore, since some output primitives are not created because tessellation is skipped, processing of non-created output primitives is avoided at later stages of the graphics pipeline.

In another example of the disclosure, a single visibility stream is generated for each input primitive for each tile of a frame. The visibility stream has a length of N bits, wherein each bit indicates whether or not an output primitive is visible in each tile when rendered, and wherein the output primitive is produced by tessellating the input primitive.

Figure 2:
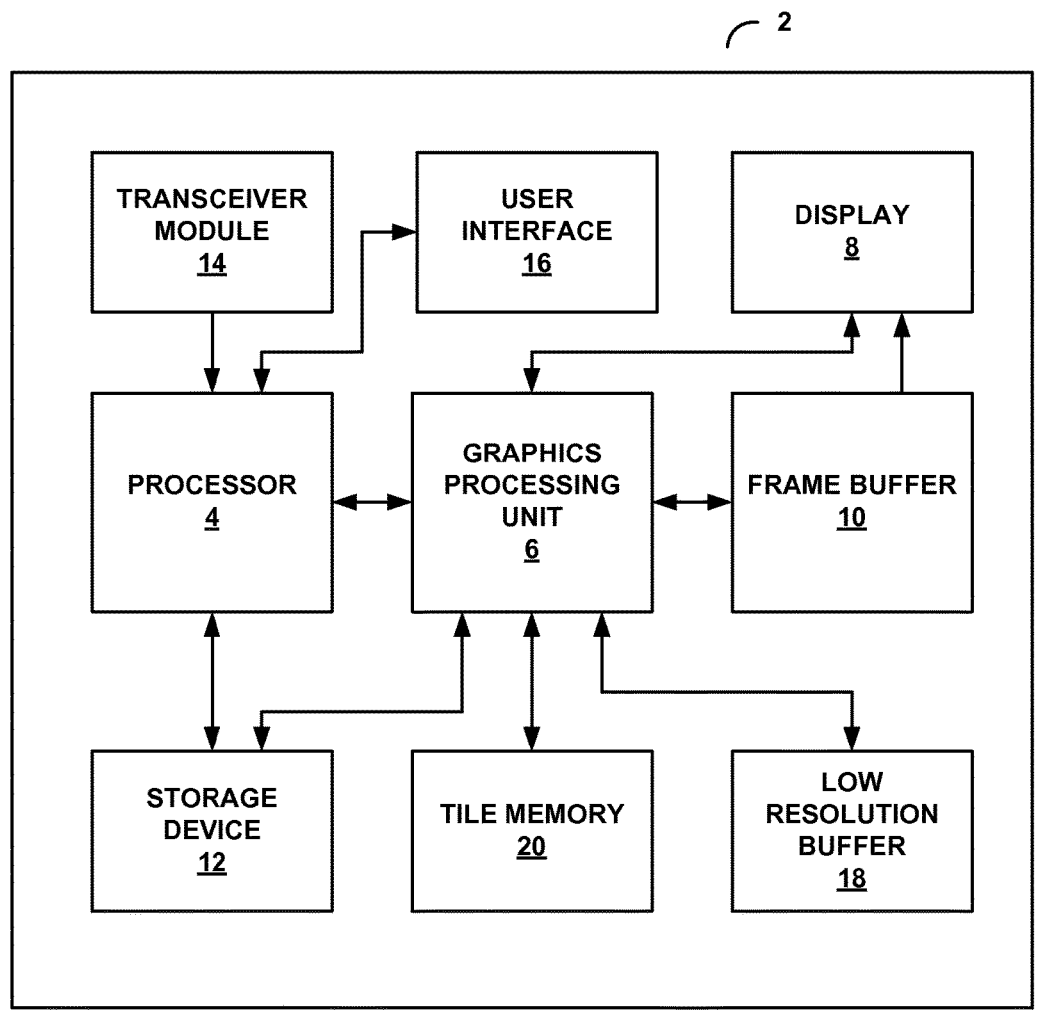
FIG. 2 is a block diagram illustrating an example graphics processing system.

FIG. 2 is a block diagram illustrating a device 2 that may be configured to implement the techniques of this disclosure. Examples of device 2 include, but are not limited to, wireless devices, mobile telephones, personal digital assistants (PDAs), portable media players, video gaming consoles (with or without integrated displays), mobile video conferencing units, laptop computers, desktop computers, television set-top boxes, tablet computing devices, e-book readers, and the like. Device 2 may include processor 4, graphics processing unit (GPU) 6, display 8, frame buffer 10, storage device 12, transceiver module 14, user interface 16, low resolution buffer 18 (which may be referred to as a low resolution-z buffer or LRZ buffer), and tile memory 20. Device 2 may include additional modules or units not shown in FIG. 2 for purposes of clarity. For example, device 2 may include a speaker and a microphone, neither of which are shown in FIG. 2, to effectuate telephonic communications in examples where device 2 is a mobile wireless telephone. Furthermore, the various modules and units shown in device 2 may not be necessary in every example of device 2. For example, user interface 16 and display 8 may be external to device 2 in examples where device 2 is a desktop computer or a video gaming console.

Processor 4 may execute one or more applications. Examples of the applications include web browsers, e-mail applications, spreadsheets, video games, or other applications that generate viewable objects for display. The one or more applications may be stored within storage device 12. In some instances, processor 4 may download the one or more applications via transceiver module 14 (e.g., from the Internet or other network). Processor 4 may execute the one or more applications based on a selection by a user via user interface 16. In some examples, processor 4 may execute the one or more applications without user interaction.

Examples of processor 4 include, but are not limited to, a digital signal processor (DSP), general purpose microprocessor, application specific integrated circuit (ASIC), field programmable logic array (FPGA), or other equivalent integrated or discrete logic circuitry. Storage device 12 may comprise one or more computer-readable storage media. Examples of storage device 12 include, but are not limited to, a random access memory (RAM), a read only memory (ROM), an electrically erasable programmable read-only memory (EEPROM), CD-ROM, Blu-Ray or other optical disk storage, magnetic disk storage, or other magnetic storage devices, flash memory, or any other medium that can be used to carry or store desired program code in the form of instructions or data structures and that can be accessed by a computer or a processor. In some aspects, storage device 12 may include instructions that cause host processor 4 and/or GPU 6 to perform the functions ascribed to host processor 4 and GPU 6 in this disclosure.

Storage device 12 may, in some examples, be considered as a non-transitory storage medium. The term "non-transitory" may indicate that the storage medium is not embodied in a carrier wave or a propagated signal. However, the term "non-transitory" should not be interpreted to mean that storage device 12 is non-movable. As one example, storage device 12 may be removed from device 2, and moved to another device. As another example, a storage device, substantially similar to storage device 12, may be inserted into device 2. In certain examples, a non-transitory storage medium may store data that can, over time, change (e.g., in RAM).

Examples of user interface 16 include, but are not limited to, a trackball, a mouse, a keyboard, gaming controller and other types of input devices. User interface 16 may also be a touch screen and may be incorporated as a part of display 8. Transceiver module 14 may include circuitry to allow wireless or wired communication between device 2 and another device or a network. Transceiver module 14 may include modulators, demodulators, amplifiers and other such circuitry for wired or wireless communication.

GPU 6 is a dedicated processor designed to quickly manipulate data using a highly parallel structure. In particular, GPU 6 may be configured to execute programmable and fixed function stages of a rendering pipeline to perform graphical processing. In one example, GPU 6 may be configured to execute a three-dimensional graphics rendering pipeline to render three-dimensional objects to two-dimensional space for display. For example, GPU 6 may perform functions such as shading, blending, illuminating, and others to generate pixel values for the pixels to be displayed on display 8. Pixels produced by GPU 6 may be stored in frame buffer 10 prior to display. In some examples, prior to performing functions such as shading, blending, and illuminating, GPU 6 may perform a binning pass, also referred to as a tiling function.

Although one GPU 6 is illustrated in FIG. 1, aspects of this disclosure are not so limited. In some examples, device 2 may include a plurality of GPUs or GPU cores, similar to GPU 6. The graphics processing tasks may be split among these GPUs or GPU cores.

For executing a binning pass, GPU 6 may divide the pixels on display 8 into a plurality of blocks of pixels referred to as tiles, as is shown in FIG. 1. For example, assume that display 8 is configured to include 640×480 pixels. As one example, GPU 6 may divide the display into 10×10 tiles, where each tile includes 64×48 pixels.

Tile memory 20 may indicate the particular tiles to which an image surface belongs, during the binning pass. In some examples, tile memory 20 may be formed as a part of storage device 12, although aspects of this disclosure are not so limited. GPU 6 may store the surface identifier value for an image surface within appropriate storage locations of tile memory 20 based on which tiles the image surface belongs, during the binning pass for that image surface. Tile memory 20 may be considered as including a plurality of layers. Each layer may correspond to one of the image surfaces. Each layer may be a two-dimensional layer that includes a plurality of storage locations. Each storage location may correspond to one of the tiles of display 8.

Low resolution buffer 18 may be a two-dimensional buffer with a plurality of storage locations. In some examples, low resolution buffer 18 may be formed as a part of storage device 12, although aspects of this disclosure are not so limited. As described in more detail below, low resolution buffer 18 may promote efficient indication of which pixels should be rendered to avoid unnecessarily rendering pixels that are subsequently occluded. Each storage location in low resolution buffer 18 may correspond to a block of pixels represented on display 8. For instance, a block of 4×4 pixels represented on display 8 may correspond to one storage location in low resolution buffer 18. A block of 4×4 pixels is provided for purposes of illustration, and should not be considered as limiting. Low resolution buffer 18 may be considered as a low resolution buffer because each storage location of low resolution buffer 18 corresponds to a plurality of pixels, rather than a single pixel.

Figure 3:
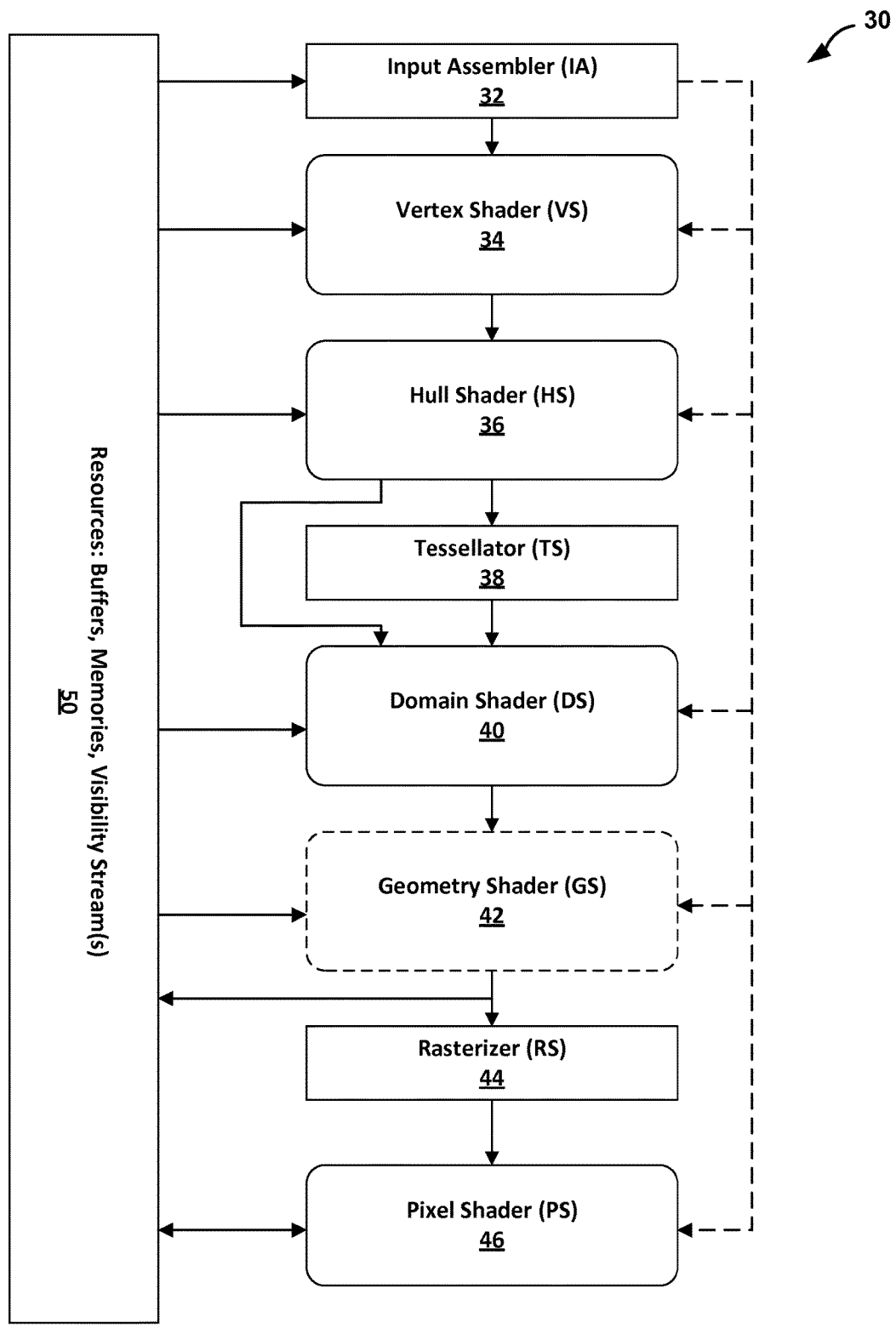
FIG. 3 is a block diagram illustrating an example graphics pipeline using tessellation.

FIG. 3 depicts an example graphics pipeline 30 that may be executed by GPU 6 of FIG. 2. As mentioned above, graphics pipeline 30 may be implemented in a tile-based rendering architecture, where tiles of an entire frame are rendered separately and then combined for display. Graphics pipeline 30 may be implemented according to Microsoft's DirectX11 API. The DirectX11 API includes three stages not found in previous iterations of the DirectX APIs: a programmable hull shader (HS) 36, a fixed function tessellator (TS) 38, and a programmable domain shader (DS) 40. The hull shader 36, tessellator 38, and domain shader 40 are sometimes referred together as the "tessellation pipeline."

The input assembler (IA) 32 reads out vertices from memory for the basic primitives. The basic primitives may be stored in a memory of resources 50 (e.g., the tile memory 20 of FIG. 2). In some examples, the basic primitive for a graphics pipeline is a triangle. For graphics pipelines that include a tessellation stage, like graphics pipeline 30, the basic primitive may be a patch. A patch is essentially a representation of a surface or mesh. A patch may include 1 to 32 different control points to define the surface. The remaining discussion of the graphics pipeline will make the assumption that the basic primitive is the patch; however, the techniques of this disclosure are applicable for other basic primitive types.

The vertex shader (VS) 34 is a programmable stage that performs operations on each control point of the patch. The vertex shader 34 transforms each control point's 3D position in virtual space to the 2D coordinate at which it appears on the screen as well as a depth value. Vertex shaders can manipulate properties such as position, color, and texture coordinate, but do not create new control points. The output control points of the vertex shader 34 go to the hull shader 36.

The hull shader 36 performs two operations. For most patches, the transformed control points from the vertex shader are simply passed to the domain shader 40. The control points of patches that represent a more complex surface may need additional processing by the hull shader 36 before being passed to the domain shader 40. The hull shader also determines the level of tessellation to be performed on each patch and sends this "tessellation factor" to the tessellator 38.

The basic function of the tessellator 38 is to tessellate (i.e., subdivide) input primitives (e.g., patches) of a 3D scene into multiple output primitives. The tessellator 38 subdivides these patches into smaller output primitives, such as triangles, quads or isolines in accordance with the tessellation factor provided by the hull shader 36. The output of the tessellator 38 is a set of vertices that define the output primitives. Tessellation allows for rendering a smoother curved surface resulting in more graphically detailed images.

The domain shader 40 is the final stage of the tessellation pipeline. The domain shader 40 operates on the output vertices created by the tessellator 38. The domain shader 40 is responsible for calculating the final output vertex positions and attributes from the control points received from the hull shader 36.

The geometry shader (GS) 42 is an optional programmable stage that may be used to create additional primitives from the tessellated output primitives received from the tessellation pipeline. The geometry shader 42 allows for even more graphically detailed images.

In the remaining stages of the pipeline, the rasterizer (RS) 44 transforms the output primitives from the tessellation pipeline and/or geometry shader 42 from 3D space into pixel values in 2D space. The programmable pixel shader (PS) 46 may then perform further operations on the pixels, such as depth test, clipping, scissoring, blending, etc. The output of the pixel shader 46 is stored in frame buffer 10 and may then be displayed on display, such as display 8 (see FIG. 2).

To avoid unnecessary GPU processing and to make the most efficient use of limited graphics memory of a tile-based rendering architectures, this disclosure proposes the use of visibility streams with a graphics pipeline having tessellation stages (e.g., the graphics pipeline of FIG. 3). A visibility stream is a series of bits (0/1) that describe for every primitive whether it contributes to the rendered tile. That is, the visibility stream indicates to different stages of the rendering pipeline whether or not the primitive is visible in the currently rendered frame. The visibility streams are generated at the beginning of each frame in a "binning" pass that is executed prior to rendering the tiles. One or more visibility streams are generated for each tile in the frame. During tile renderings, the corresponding visibility stream(s)

for that tile is used to cull irrelevant (i.e., they will not be seen) primitives that do not contribute to the rendered tile.

This disclosure proposes the generation of visibility streams which encode both tessellator input (i.e., patches) and output (i.e., triangles, quads, or isolines) primitives into one or more visibility streams per tile. By utilizing visibility information for the input and output primitives, such a tessellation algorithm culls full input patches that do not contribute to the currently rendered tile (e.g., using the input primitive visibility stream), and also culls tessellator stage output primitives that do not contribute to the currently rendered tile (e.g., using the output primitive visibility stream). By using these visibility streams at both the input and the output of the tessellator stage, a reduction in the number of irrelevant or duplicative invocations of later stages in the rendering pipeline (e.g., domain shader 40) may be achieved. Essentially, the visibility streams allow one or more stages of the rendering pipeline to be skipped for input or output primitives that are indicated as not visible by the input and output visibility streams. Additionally, a reduction in the number of clock cycles that the tessellator hardware needs to consume to tessellate one input patch is achieved as processing irrelevant or not visible output primitives can be avoided.

In one aspect of the disclosure, two visibility streams are generated per tile in a binning pass prior to rendering. One for the tessellation input primitives (patches) and one for tessellation output primitives (triangles). In another aspect of the disclosure, the input and output visibility streams may be merged into a single visibility stream or may be used together with the geometry shader.

Figure 4:
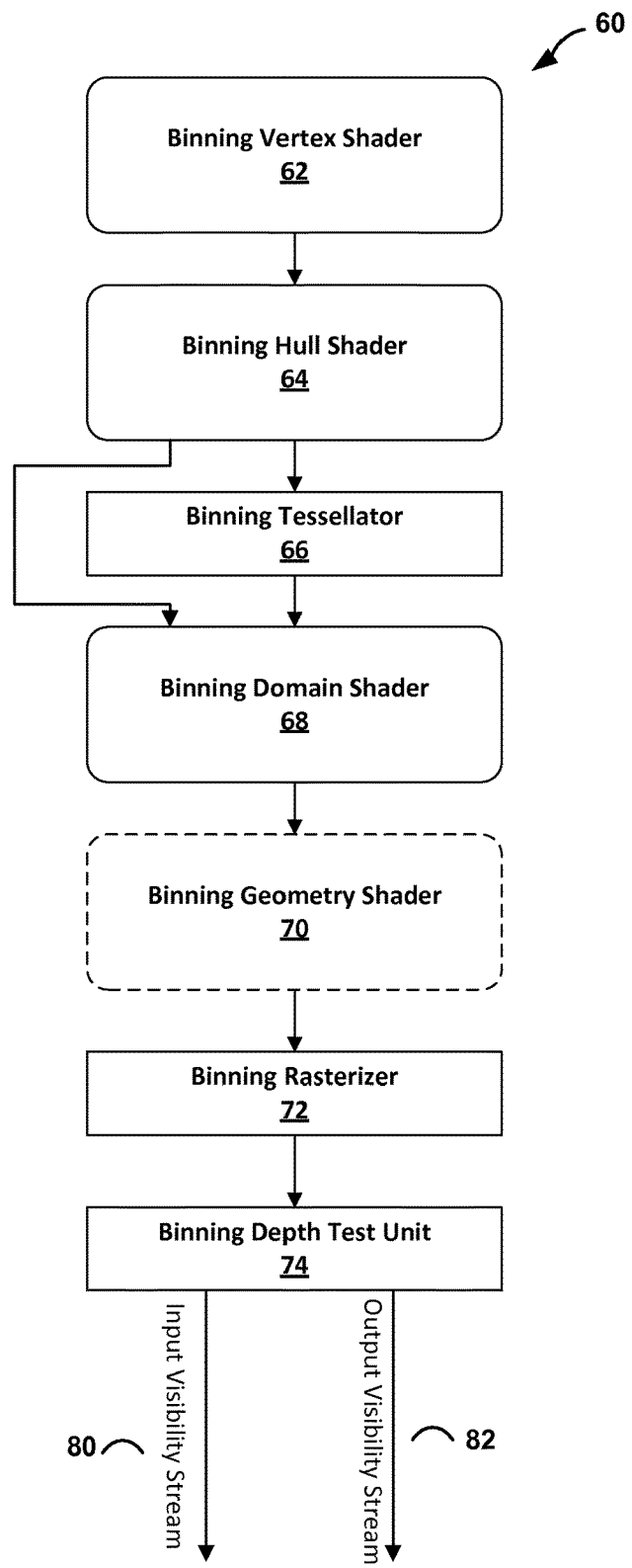
FIG. 4 is a block diagram illustrating an example binning pipeline that generates an input visibility stream and an output visibility stream.

FIG. 4 is a block diagram illustrating an example binning pipeline that generates an input visibility stream and an output visibility stream. The binning pipeline may be executed by GPU 6 of FIG. 2. To produce a visibility stream, binning pipeline 60 performs a binning pass that processes the input primitive for the whole frame. The binning pipeline is a simplified version of the full rendering pipeline shown in FIG. 3. For a graphics pipelines that includes the tessellation stages (i.e., HS/TS/DS) and an optional geometry shader, the binning pipeline 60 may include a binning vertex shader 62, a binning hull shader 64, a binning tessellator 66, a binning domain shader 68, an optional binning geometry shader 70, a binning rasterizer 72, and a binning depth test 74.

The binning vertex shader 62 may also be referred to as a binning shader. The binning shader may be a modified version of the vertex shader, where the only output is the vertex position. All parameter exports typically performed by a vertex shader can be removed from the binning shader, as well as any calculations related to them.

From the vertices output by the binning vertex shader 62, the binning hull shader 64, the binning tessellator 68, and the binning domain shader produce the tessellated output primitives in the same manner as the tessellation pipeline of FIG. 3. The binning hull shader 64 and the binning tessellator 68 may be optimized relative to the corresponding stages in the tessellation pipeline of FIG. 3. In particular, the binning hull shader 64 and the binning tessellator 68 may be optimized to compute only position-related variables.

If the geometry shader is enabled for the full rendering pipeline, the binning pipeline 60 may also include a binning geometry shader 70 which produces additional output primitives from the tessellated output primitives produced by the binning tessellator.

The binning rasterizer 72 generates a low-resolution representation of the output primitives in 2D spaces (i.e., pixels). Each pixel represents a pixel area (e.g., a 4×4 pixel area) in the final image. The generated low-resolution pixels can have two values: partially covered or fully covered. The binning rasterizer 72 uses the same culling rules (faceness, frustum, etc.) as a normal rasterization stage, and therefore produces only those triangles that are actually visible to the scene.

The final stage in the binning pass is the binning depth test unit 74 (also called a low-resolution Z test). The binning depth test unit 74 determines is the pixels rasterized from the output primitives are visible in the final scene. The binning depth test unit 74 writes to the low resolution buffer 18 (see FIG. 2, also called the low resolution z-buffer) only in situations where pixels are covered fully by the triangle. Partially covered pixels are not written to the lower resolution buffer. At the end of the binning pass, low resolution buffer 18 can be written out to an external memory, and can later be used for initializing a Z-buffer for use during the rendering pass. This provides for improved depth testing during rendering (e.g., in the pixel shader 46 of FIG. 3). An internal graphics memory of GPU 6 may also be used as a low resolution buffer during the binning pass. Since the rendering passes are done in 4×4 pixel blocks, the Z-buffer in graphics memory is also in this resolution. Furthermore, no color buffer in graphics memory is needed. This means that the low resolution buffer 18 can cover a very large on-screen area compared to the full resolution.

Primitives that pass the binning depth test for a specific tile (i.e., the pixels produced by rasterizing the primitive are visible in that tile) are marked as visible in the visibility stream. Primitives that do not pass the low resolution Z-test for a specific tile (i.e., pixels produced by rasterizing the primitives are not visible in that tile) are marked as not visible in the visibility stream. As most pixels rasterized from most triangles will not be visible for any given tile, the visibility streams for each tile may consist of a large number of zeroes indicating the respective primitives are not visible. As such, the visibility streams may be compressed using a run length compression algorithm.

The output visibility stream 82 encodes the visibility of output primitives (e.g., triangles). The output visibility stream includes one bit per output primitive that indicates whether the output primitive is visible in a corresponding tile (e.g., 1 for visible, 0 for not visible, or vice versa). The input visibility stream 80 encodes the visibility of input primitives (e.g., patches in DX11). A patch is considered to be visible if at least one output primitive formed from the patch is determined to be visible by the binning depth test unit 74. If no output primitives formed from the patch are visible, than the entire patch can be indicated as not visible in the input visibility stream. In this case, the corresponding bit in the input visibility stream may be set to zero. Alternatively, if at least one output primitive formed from the path is visible, then the entire patch can be indicated as visible in the input visibility stream, e.g., by setting the corresponding bit to one.

Figure 5:
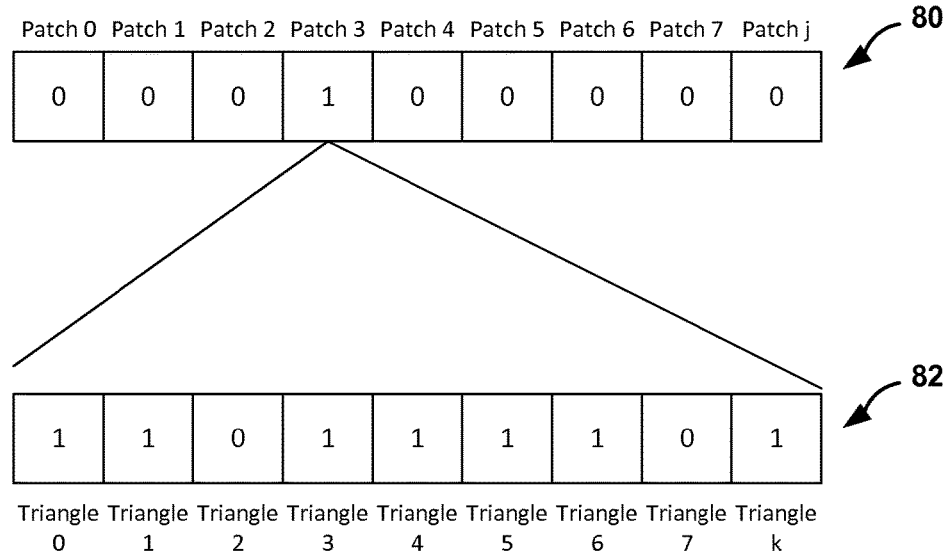
FIG. 5 is a conceptual diagram illustrating an example input visibility stream and an example output visibility stream.

FIG. 5 is a conceptual diagram illustrating an example input visibility stream and an example output visibility stream. Input visibility stream 80 may include a string of ones and zeros for each patch, where one bit indicates that at least a portion of the patch is visible in the final scene (e.g., bit 1 for Patch 3) and another bit indicates that the entire patch is not visible in the final scene (e.g., bit 0 for Patch 0). Output visibility stream 82 may include of a string of ones and zeros for each triangle, where one bit indicates that the triangle contributes to a pixel that is visible in the final scene (e.g., bit 1 for Triangle 0) and another bit indicates that the triangle does not contribute to a pixel that is visible in the final scene (e.g., bit 0 for Triangle 2). As shown in FIG. 5, the output visibility streams may be created on a per patch basis. That is, there is one output visibility stream per patch for each tile. In another example, each tile may have one output visibility stream that concatenates together all the output primitives formed from the input primitives.

Returning to FIG. 3, the output and input visibility streams may be stored in a memory (e.g., the memory 20) and made available to rendering pipeline stages through resources 50. One or more rendering stages may be skipped when rendering an input primitive or an output primitive based on the visibility indicated by the input visibility stream and output visibility stream, respectively.

As one example, utilizing the output visibility stream, the tessellator 38 can skip over a large number of output triangles when they are not visible or located in the currently rendered tile. Likewise, if the input visibility stream indicates that a patch is visible, that patch is processed for the current tile during the rendering pass, otherwise the patch is culled (i.e., rendering is skipped for that patch).

Figure 6:
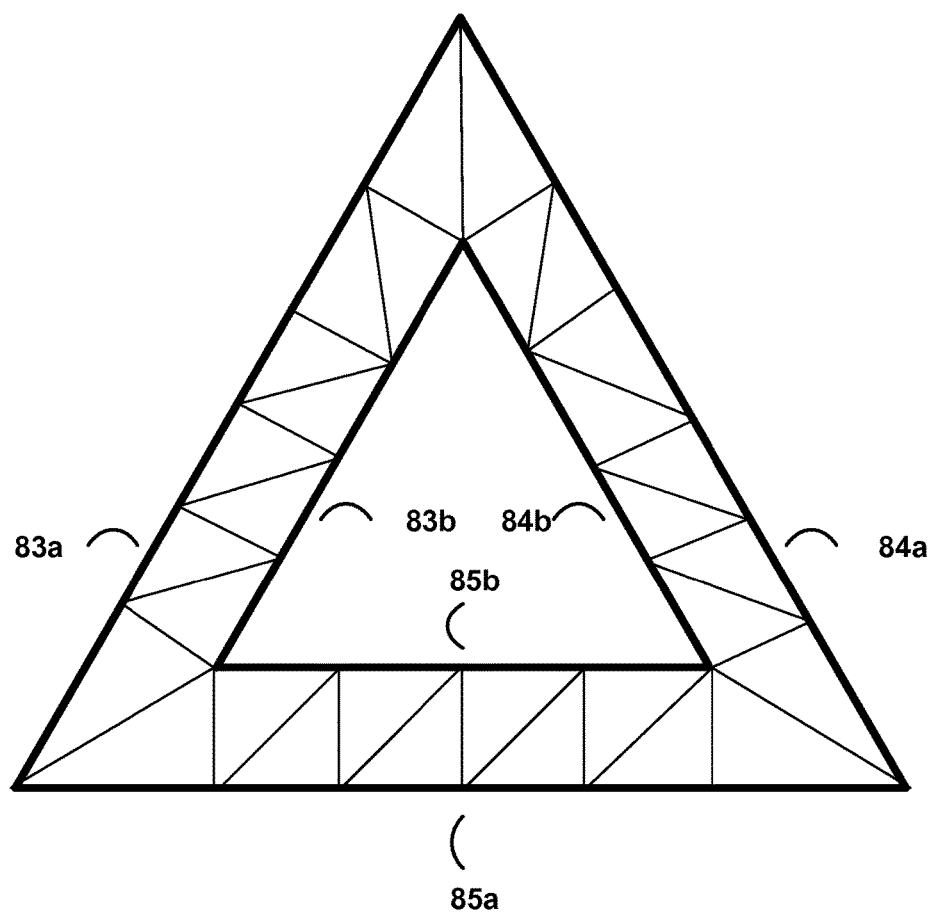
FIG. 6 is a conceptual diagram illustrating an example technique for tessellating an input primitive.
Figure 7:
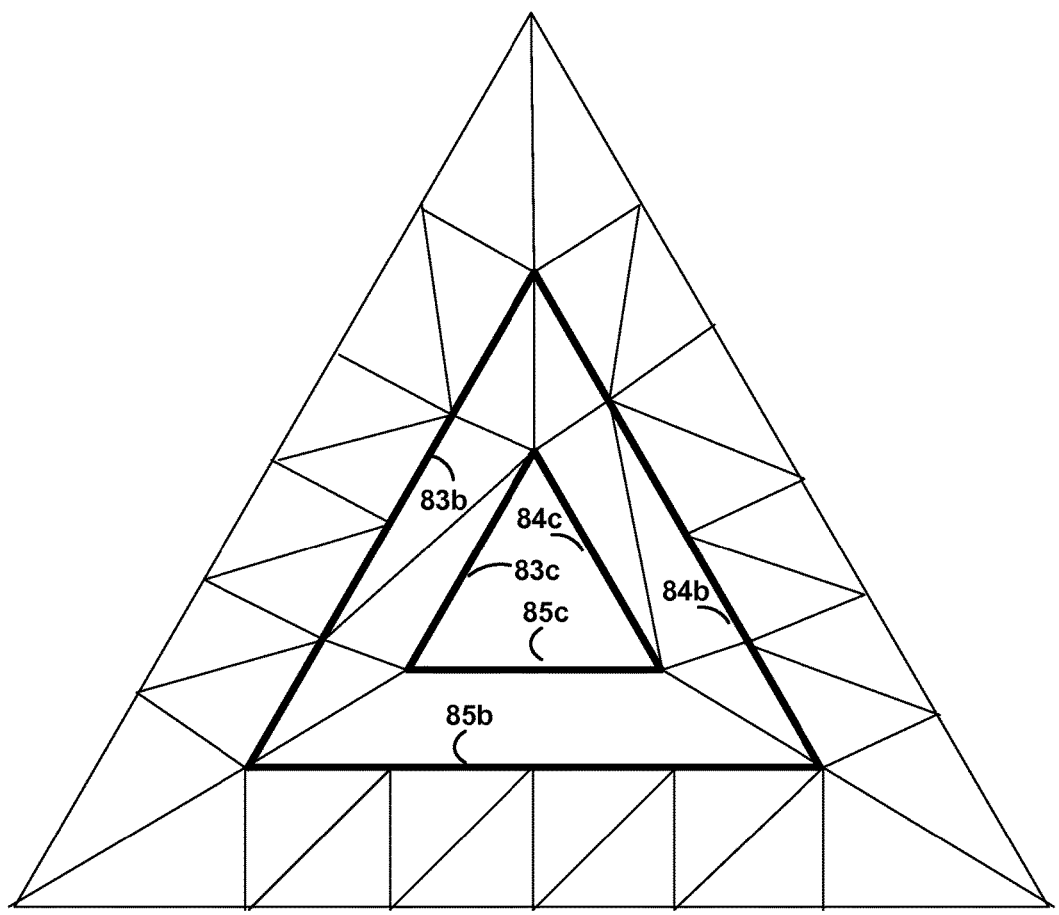
FIG. 7 is a conceptual diagram illustrating an example technique for tessellating an input primitive.

In particular, skipping rendering for a not visible input may involve avoiding tessellation of the entire input primitive when the input visibility stream indicates that the input primitive is not visible. As such, output primitives are not created for that input primitive, and thus are not available for processing by further stages of the pipeline. Likewise, skipping rendering for not visible output primitives may involve skipping tessellation for a specific portion of a patch that would produce the not visible output primitives. The skipping process used may be tessellation hardware dependent. One example is described below with reference to FIGS. 6 and 7. FIGS. 6 and 7 are conceptual diagrams illustrating an example technique for tessellating an input primitive.

Input patch tessellation typically involves adding a smaller triangle inside the input triangle, and tessellating the area between the two triangles by considering one edge from both triangles pair wise (i.e., one edge from the larger triangle and one edge from smaller the triangle that are oriented in the same direction). As shown in FIG. 6, tessellation may occur between edge pair 83a and 83b, between edge pair 84a and 84b, and between edge pair 85a and 85b. After tessellation is completed for the three edge pairs, then the new smaller input triangle is inserted inside the previous smaller triangle (See FIG. 7). As shown in FIG. 7, edges 83b, 84b, and 85b are now paired with edged 83c, 84c, and 85c, respectively. This process continues until the input triangle is fully tessellated. The amount of tessellation (i.e., the tessellation level) is defined by the tessellation factors generated by the hull shader 36 (see FIG. 3).

As can be noted from the example tessellation procedure above, the tessellation process proceeds by one edge pair at a time. By using the triangle visibility information from the output visibility stream, an enhanced tessellator implementation can skip the processing of whole edge pairs if none of the output triangles for the currently tessellated area are going to be visible in the currently rendered tile. For example, the area between edge pair 85b and 85c may contain output primitives that are indicated as being not visible by the output visibility stream. As such, tessellation may be skipped for this edge pair, and no output triangles are created, as is shown in FIG. 7. It is also possible to skip several edge pairs with a single test, because for one triangle pair, it is known after the setup phase, based on the tessellation factor received from the hull shader, how many triangles are going to be generated in the area between the two triangles (multiple edge pairs can be considered in parallel or potentially together).

In another example of the disclosure, rather than creating a visibility stream for input primitives and a separate visibility stream for output primitives, a single visibility stream is created. In such cases, the single visibility stream would be encoded for maximum tessellation output. That is to say, the length of the visibility stream would be defined by the largest amount of tessellated primitives given the largest possible tessellation factor and patch size as defined for a specific rendering pipeline. For example, maximum tessellation output may be defined by the DirectX11 API. The single visibility stream would indicate the visibility of output primitives on a per patch basis for each tile. If one output primitive in the single visibility stream for a patch is visible, then the patch is also visible. The visibility stream for each patch would have a length N, where N corresponds to the maximum tessellation output (i.e., the maximum number of output triangles possible).

Figure 8:
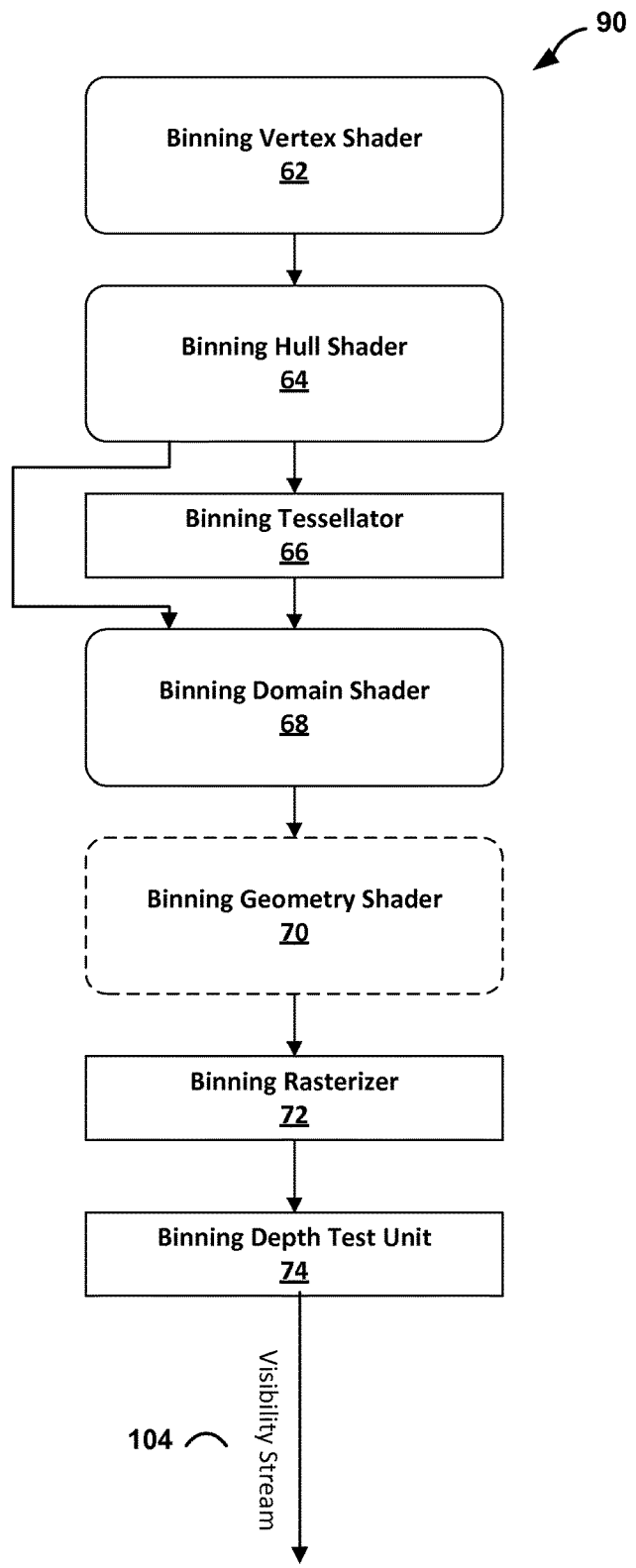
FIG. 8 is a block diagram illustrating an example binning pipeline that generates an input visibility stream.

FIG. 8 is a block diagram illustrating an example binning pipeline that generates a single visibility stream. Binning pipeline 90 would operate in a similar fashion as binning pipeline 60 of FIG. 4. However, instead of creating two visibility streams, binning pipeline 90 creates a single visibility stream 104. By default, each bit in the visibility stream 104 for an entire patch would be encoded with 0's (i.e., no output triangles of the tessellator are assumed to visible). If any tessellator output triangles are found to be visible in the currently rendered tile by the binning depth test unit 74, corresponding bits from the visibility stream are set to 1. When tiles are rendered, the visibility streams may be simply checked to determine if any of the visibility bits would be 1 inside a single patch area in the single visibility stream. If all values inside the patch are 0, this can be determined, e.g., in one clock cycle. If all visibility bits for a patch are 0, both the vertex shader and the tessellation pipeline may be skipped for that patch. If any of the visibility bits in the visibility stream are 1, the patch is processed as normal. However, now the tessellator may be configured to skip tessellation of certain output primitives that are defined as not visible (0's) by the visibility stream. As such, by skipping both non-visible patches and triangles, unnecessary processing is avoided for the vertex shader, tessellation pipeline, as well as the rasterizer.

FIG. 9 is a conceptual diagram illustrating an example single visibility stream. Visibility stream 104 is of a length N, where N defines the maximum number of output primitives per patch as defined by the rendering pipeline.

Returning to FIG. 8, in another example of the disclosure, a single visibility stream may also be used when a geometry shader is enabled. As mentioned above, the geometry shader may produce even more primitives from the primitives output by the tessellation pipeline. The maximum amount of data that a single geometry shader invocation can generate is limited to 4 kB by the DX11 API. Similarly to merging input and output visibility streams together based on maximum tessellation output described-above, a single output visibility stream with the geometry shader enabled would encode the maximum value of tessellated primitives multiplied by the maximum number of geometry shader generated primitives. That is, if the maximum number of tessellation output primitives is N, and the maximum number of output primitives from the geometry shader is M, the length of the visibility stream when the geometry shader is enabled would be N×M. In this example, binning geometry shader 70 would be enabled so that binning depth test unit 74 may determine if the primitives produced by the geometry shader are visible in the final scene.

Again, the default values for this single visibility stream are 0's. If any geometry shader output triangles are determined to be visible in the currently rendered tile during the binning pass by the binning depth test unit 74, its corresponding visibility bit would be set to 1. When the tile is rendered, the visibility stream is checked to determine if any of the visibility bits are set to 1 inside a single patch area in the single visibility stream. If all values inside the patch are 0, this can be determined in one clock cycle. Correspondingly, the tessellator 38 (see FIG. 3) may check every geometry shader output visibility bit range (range size is the maximum number of geometry shader output primitives), if any geometry shader output primitives were visible to determine whether the currently tessellated triangle would need to be generated and sent for processing by the domain shader 40 or geometry shader 42.

Returning to FIG. 9, single visibility stream 104' is used for a graphics pipeline having both a tessellation stage as well as an enabled geometry shader. Single visibility stream 104' is of a length N×M, where N defines the maximum number of output primitives per patch as defined by the rendering pipeline and M defines the maximum number of output primitives that may be generated by the geometry shader.

Figure 10:
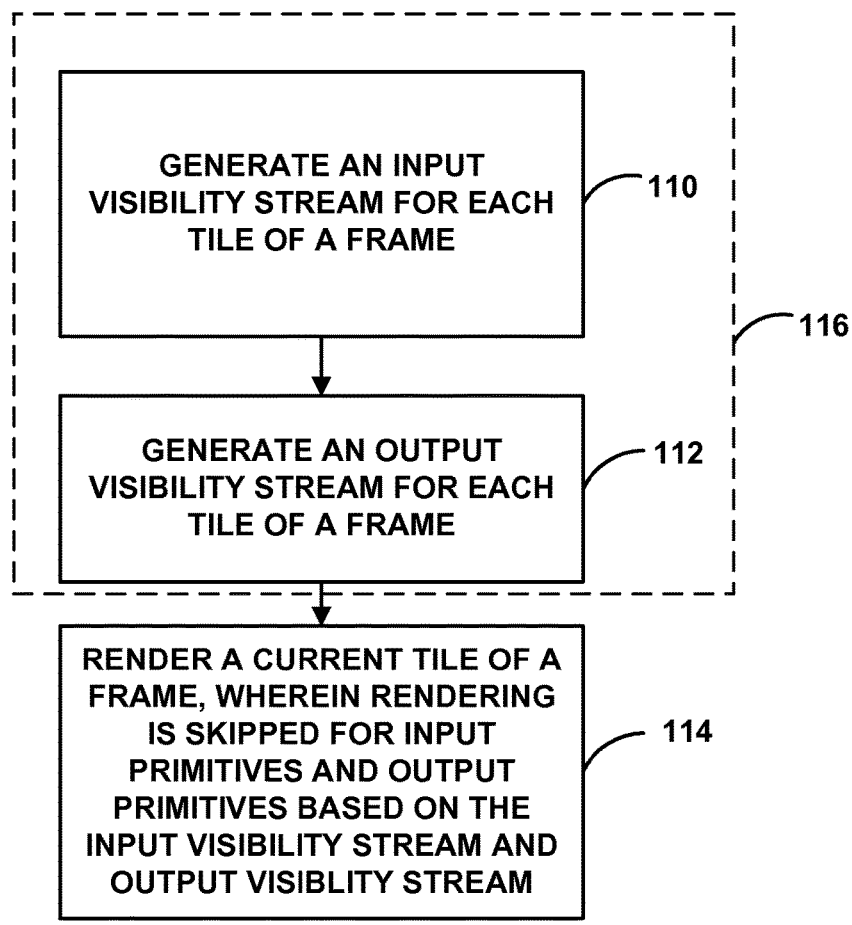
FIG. 10 is a flowchart illustrating an example method for performing tessellation in a tile-based rendering pipeline.

FIG. 10 is a flowchart illustrating an example method for performing tessellation in a tile-based rendering pipeline. As one example, the method may be performed by GPU 6 of FIG. 2. GPU 6 may be configured to generate an input visibility stream for each tile of a frame (110), and generate an output visibility stream for each tile of the frame (112). The input visibility stream indicates whether or not an input primitive is visible in each tile when rendered. The output visibility stream indicates whether or not an output primitive is visible in each tile when rendered. The output primitive is produced by tessellating the input primitive.

GPU 6 may be further configured to render the current tile of the frame, wherein rendering is skipped for input primitives and out primitives based on the input visibility stream and the output visibility stream, respectively (114). In particular, skipping rendering for output primitives may include skipping tessellation for output primitives indicated as being non-visible in the current frame by the output visibility stream.

Figure 11:
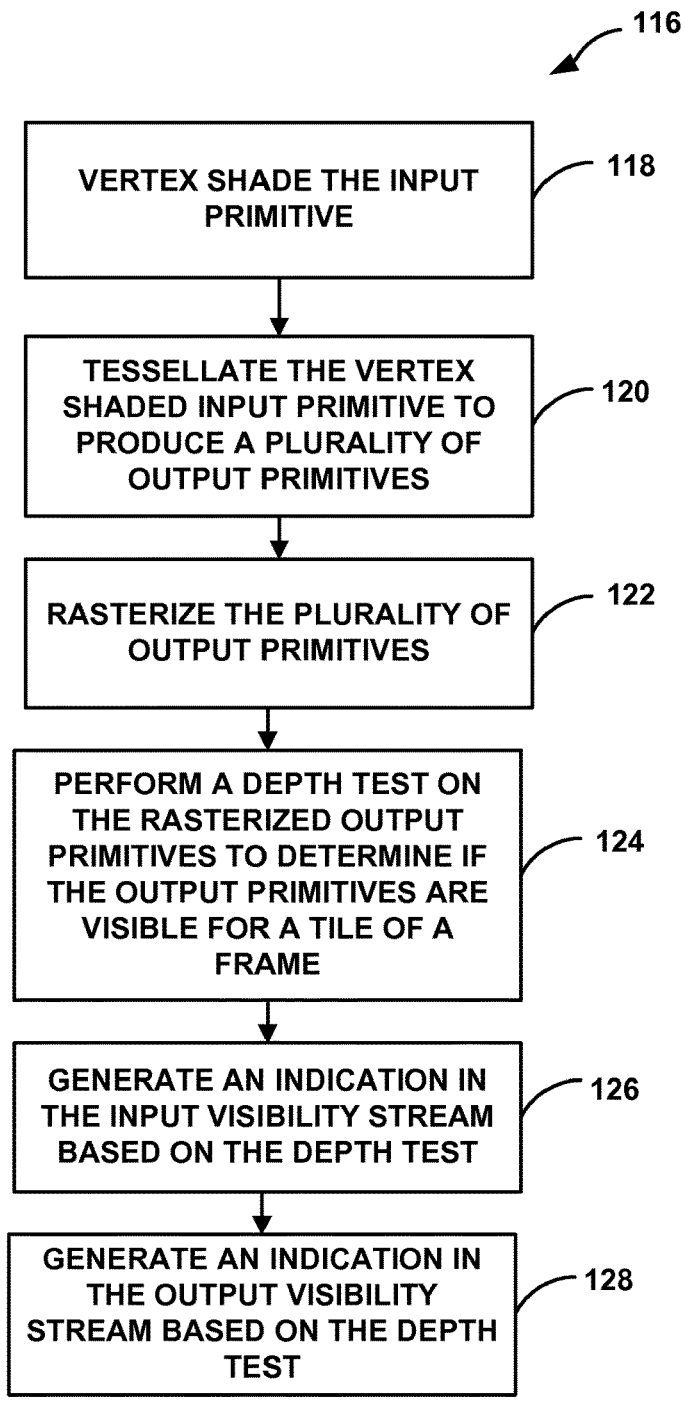
FIG. 11 is a flowchart illustrating an example method of a binning pass in a tile-based rendering pipeline.

The steps of generating the input visibility stream (110) and generating the output visibility stream (112) may be performed together in a binning pass (116). FIG. 11 is a flowchart illustrating an example method of a binning pass in a tile-based rendering pipeline. GPU 6 may also be configured to perform binning pass 116. GPU 6 may be further configured to vertex shade the input primitive (118), tessellate the vertex shaded input primitive to produce a plurality of output primitives (120), rasterize the plurality of output primitives (122), and performing a depth test on the rasterized output primitives to determine if the output primitives are visible for a tile of a frame (124).

GPU 6 generates an indication in the input visibility stream of whether or not the input primitive is visible in the tile based on the depth test, wherein the input primitive is determined to be visible if any of the output primitives produced by tessellating that input primitive are determined to be visible (126). Likewise, GPU 6 generates an indication in the output visibility stream of whether or not the output primitive is visible in the tile based on the depth test (128).

Figure 12:
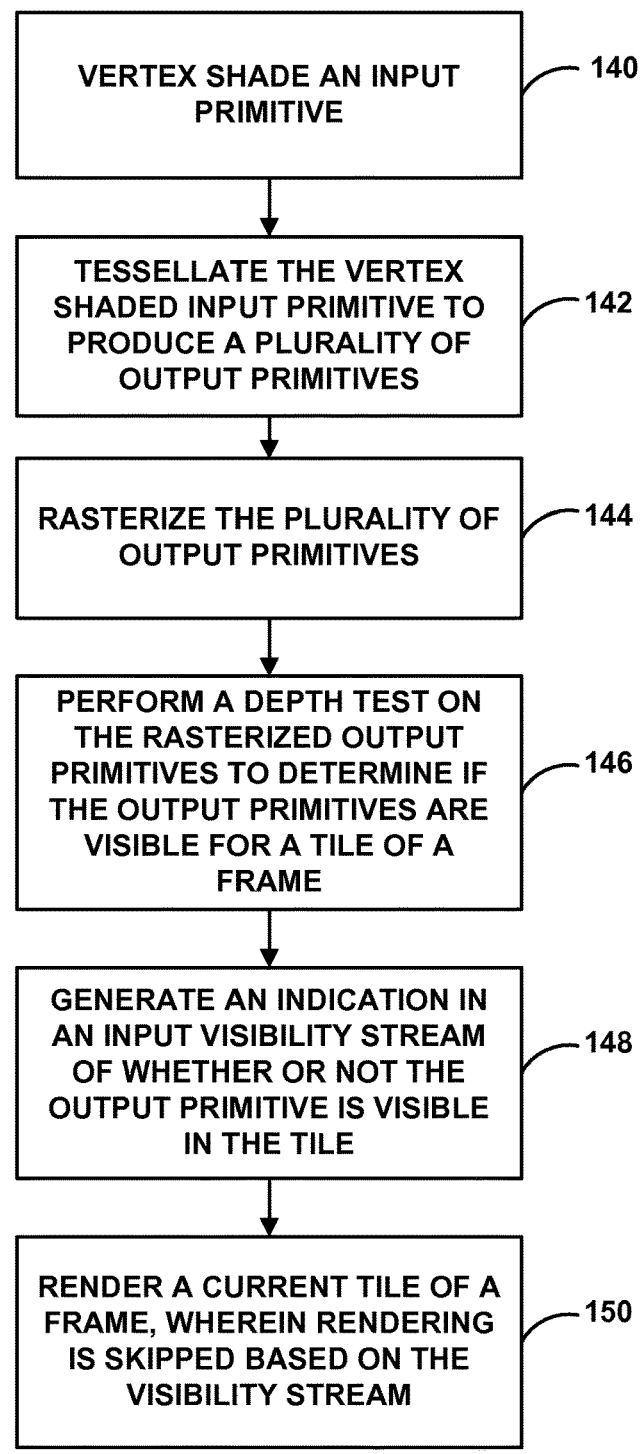
FIG. 12 is a flowchart illustrating another example method for performing tessellation in a tile-based rendering pipeline.

FIG. 12 is a flowchart illustrating another example method for performing tessellation in a tile-based rendering pipeline. In this example, a single visibility stream is generated per input primitive that indicates the visibility of the output primitives that may be formed from the input primitive. GPU 6 may be configured to vertex shade an input primitive (140), tessellate the vertex shaded input primitive to produce a plurality of output primitives (142), rasterize the plurality of output primitives (144), and perform a depth test on the rasterized output primitives to determine if the output primitives are visible for a tile of a frame (146).

GPU 6 may be further configured to generate an indication in a visibility stream of whether or not the output primitive is visible in the tile based on the depth test (148). The visibility stream may have a length of N bits, wherein each bit indicates whether or not an output primitive is visible in each tile when rendered. The length N is determined by the maximum number of output primitives per input primitive as defined by a rendering pipeline. GPU 6 may also be configured to render a current tile of a frame, wherein rendering is skipped for input primitives in the case that every bit in the visibility stream indicates a non-visible output primitive, and wherein rendering is skipped for output primitives indicated as being non-visible in the current frame by the visibility stream (150).

Figure 13:
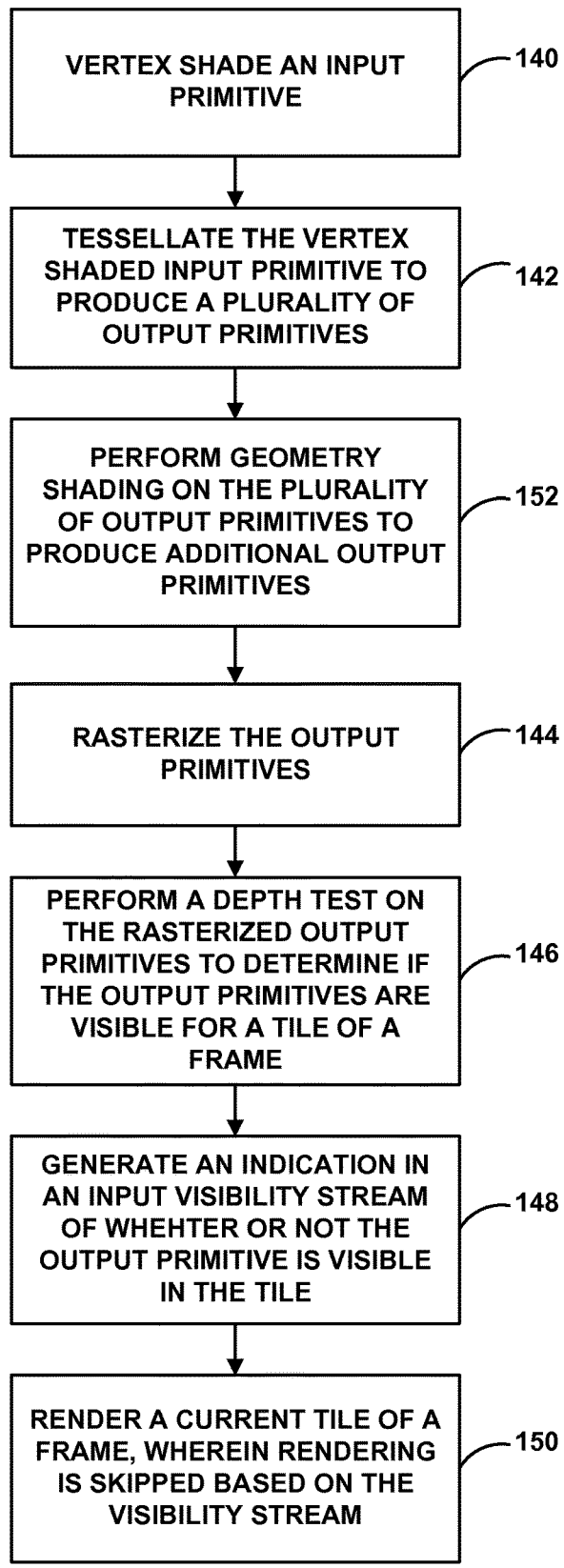
FIG. 13 is a flowchart illustrating another example method of a binning pass in a tile-based rendering pipeline.

FIG. 13 is a flowchart illustrating another example method of a binning pass in a tile-based rendering pipeline. The process shown in FIG. 13 is the same as that shown in FIG. 12 except for the addition of a geometry step (152). In the case that the GPU 6 has an enabled geometry shader, an additional step of performing geometry shading of the plurality of output primitives to produce additional output primitives (152) is performed between the tessellation (142) and rasterization (144) steps. In this example, the visibility stream would have an increase length of N×M bits, wherein M is the maximum number of output primitives produced by the geometry shader.

In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for tessellation in a tile-based graphics rendering pipeline by a graphics processor, the method comprising:
   generating an input visibility stream for each tile of a frame before rendering the frame, the input visibility stream indicating whether or not an input primitive is visible in each tile when rendered;
   generating an output visibility stream for each tile of the frame before rendering the frame, the output visibility stream including an indication of whether or not an output primitive is visible in the tile based on a depth test, wherein the output primitive is determined to be visible if any pixel produced by rasterizing the output primitive is determined to be visible, and wherein the output primitive is produced by tessellating the input primitive, wherein the output visibility stream comprises a series of bits that indicate for every output primitive whether it contributes to the rendered tile or not and the input visibility stream comprises a series of bits that indicate for every input primitive whether it contributes to the rendered tile or not; and
   tessellating the input primitives to create the output primitives for a current tile based on the input visibility stream and the output visibility stream, wherein tessellating the input primitives comprises:
      skipping tessellation for the input primitives indicated by the input visibility stream as not contributing to the current tile; and
      performing tessellation, based on the output visibility stream, for input primitives indicated by the input visibility stream as contributing to the current tile, wherein tessellation is skipped for a portion of the input primitives for which corresponding output primitives are indicated as not contributing to the current tile by the output visibility stream.

2. The method of claim 1, wherein generating the input visibility stream comprises:
   vertex shading the input primitive;
   hull shading the vertex shaded input primitive;
   tessellating the hull shaded input primitive to produce a plurality of output primitives;
   domain shading the plurality of output primitives;
   rasterizing the plurality of output primitives to produce pixels;
   performing a depth test to determine if the pixels are visible for a tile of a frame; and
   generating an indication in the input visibility stream of whether or not the input primitive is visible in the tile based on the depth test, wherein the input primitive is determined to be visible if any of the pixels produced by rasterizing the output primitives associated with the input primitive are determined to be visible.

3. The method of claim 1, wherein the input primitive is a patch and wherein the output primitive is a triangle, quad or isoline.

4. The method of claim 1, further comprising:
   rendering the current tile of the frame, wherein rendering is skipped for input primitives indicated as being non-visible in the current tile by the input visibility stream.

5. The method of claim 1, further comprising:
   rendering the current tile of the frame, wherein rendering is skipped for output primitives indicated as being non-visible in the current tile by the output visibility stream.

6. A method for tessellation in a tile-based graphics rendering pipeline by a graphics processor, the method comprising:
   generating a visibility stream for each input primitive for each tile of a frame before rendering the frame, the visibility stream including an indication of whether or not an output primitive is visible in the tile based on a depth test, wherein the output primitive is determined to be visible if any pixel produced by rasterizing the output primitive is determined to be visible, the visibility stream having a length of N bits, wherein each bit indicates whether or not a respective output primitive is visible in each tile when rendered, and wherein the output primitive is produced by tessellating the input primitive; and
   tessellating the input primitives to create the output primitives for a current tile based on the visibility stream, wherein tessellating the input primitives comprises skipping tessellation for a portion of the input primitives for which corresponding output primitives are indicated as not contributing to the current tile by the visibility stream.

7. The method of claim 6, wherein the length N is determined by the maximum number of output primitives per input primitive as defined by a rendering pipeline.

8. The method of claim 6, wherein generating the visibility stream comprises:
   vertex shading the input primitive;
   hull shading the vertex shaded input primitive;
   tessellating the hull shaded input primitive to produce a plurality of output primitives;
   domain shading the plurality of output primitives;
   rasterizing the plurality of output primitives to produce pixels;
   performing a depth test to determine if the pixels are visible for a tile of a frame; and
   generating the indication in the visibility stream of whether or not the output primitive is visible in the tile based on the depth test, wherein the output primitive is determined to be visible if any pixel produced by rasterizing the output primitive is determined to be visible.

9. The method of claim 6, further comprising:
   rendering the current tile of the frame, wherein rendering is skipped for input primitives in the case that every bit in the visibility stream indicates a non-visible output primitive.

10. The method of claim 6, further comprising:
    rendering the current tile of the frame, wherein rendering is skipped for output primitives indicated as being non-visible in the current tile by the visibility stream.

11. The method of claim 6, wherein the tile-based rendering architecture has an enabled geometry shader, and wherein the visibility stream has a length of N×M bits, wherein M is the maximum number of output primitives produced by the geometry shader, and wherein generating the visibility stream further comprises geometry shading the plurality of output primitives after domain shading the output primitives.

12. An apparatus configured to perform tessellation in a tile-based graphics rendering pipeline comprising:
a memory configured to store graphics data; and
a graphics processor in communication with the memory, the graphics processor configured to:
execute a binning pipeline on the graphics data, the binning pipeline configured to generate an input visibility stream for each tile of a frame before rendering the frame, the input visibility stream indicating whether or not an input primitive is visible in each tile when rendered, the binning pipeline further configured to generate an output visibility stream for each tile of the frame before rendering the frame, the output visibility stream including an indication of whether or not an output primitive is visible in the tile based on a depth test, wherein the output primitive is determined to be visible if any pixel produced by rasterizing the output primitive is determined to be visible, and wherein the output primitive is produced by tessellating the input primitive, wherein the output visibility stream comprises a series of bits that indicate for every output primitive whether it contributes to the rendered tile or not and the input visibility stream comprises a series of bits that indicate for every input primitive whether it contributes to the rendered tile or not, and
the graphics processor is further configured to execute a rendering pipeline, wherein the rendering pipeline is configured to tessellate the input primitives to create the output primitives for a current tile based on the input visibility stream and the output visibility stream, wherein tessellating the input primitives comprises skipping tessellation for the input primitives indicated by the input visibility stream as not contributing to the current tile, and performing tessellation, based on the output visibility stream, for input primitives indicated by the input visibility stream as contributing to the current tile, wherein tessellation is skipped for a portion of the input primitives where corresponding output primitives are indicated as not contributing to the current tile by the output visibility stream.

13. The apparatus of claim 12, wherein the binning pipeline comprises:
a binning vertex shader configured to perform vertex shading on the input primitive;
a binning hull shader configured to perform hull shading on the vertex shaded input primitive;
a binning tessellator stage configured to tessellate the hull shaded input primitive to produce a plurality of output primitives;
a binning domain shader configured to perform domain shading on the plurality of output primitives;
a binning rasterizer configured to rasterize the plurality of output primitives to produce pixels; and
a binning depth test stage configured to perform a depth test on the pixels to determine if the pixels are visible for a tile of a frame,
wherein the binning pipeline generates an indication in the input visibility stream of whether or not the input primitive is visible in the tile based on the depth test, wherein the input primitive is determined to be visible if any of the pixels produced by rasterizing the output primitives associated with the input primitive are determined to be visible.

14. The apparatus of claim 12, wherein the input primitive is a patch and wherein the output primitive is a triangle, quad or isoline.

15. The apparatus of claim 12, further comprising:
the rendering pipeline configured to render the current tile of the frame, wherein rendering is skipped for input primitives indicated as being non-visible in the current tile by the input visibility stream, and wherein rendering is skipped for output primitives indicated as being non-visible in the current tile by the output visibility stream.

16. An apparatus configured to perform tessellation in a tile-based rendering pipeline comprising:
a memory configured to store graphics data; and
a graphics processor in communication with the memory, the graphics processor configured to execute a binning pipeline on the graphics data before rendering the frame, the visibility stream including an indication of whether or not an output primitive is visible in the tile based on a depth test, wherein the output primitive is determined to be visible if any pixel produced by rasterizing the output primitive is determined to be visible, the binning pipeline configured to generate a visibility stream for each input primitive for each tile of a frame, the visibility stream having a length of N bits, wherein each bit indicates whether or not a respective output primitive is visible in each tile when rendered, and wherein the output primitive is produced by tessellating the input primitive,
wherein the graphics processor is further configured to execute a rendering pipeline, wherein the rendering pipeline is configured to tessellate the input primitives to create the output primitives for a current tile based on the visibility stream wherein tessellating the input primitives comprises skipping tessellation for a portion of the input primitives for which corresponding output primitives are indicated as not contributing to the current tile by the visibility stream.

17. The apparatus of claim 16, wherein the length N is determined by the maximum number of output primitives per input primitive as defined by the rendering pipeline.

18. The apparatus of claim 16, wherein the binning pipeline comprises:
a binning vertex shader configured to perform vertex shading on the input primitive;
a binning hull shader configured to perform hull shading on the vertex shaded input primitive;
a binning tessellator stage configured to tessellate the hull shaded input primitive to produce a plurality of output primitives;
a binning domain shader configured to perform domain shading on the plurality of output primitives;
a binning rasterizer configured to rasterize the plurality of output primitives to produce pixels; and
a binning depth test stage configured to perform a depth test on the pixels to determine if the pixels are visible for a tile of a frame,
wherein the binning pipeline generates the indication in the visibility stream of whether or not the output primitive is visible in the tile based on the depth test, wherein the output primitive is determined to be visible if any pixel produced by rasterizing the output primitive is determined to be visible.

19. The apparatus of claim 16, further comprising:
the rendering pipeline configured to render the current tile of the frame, wherein rendering is skipped for input primitives in the case that every bit in the visibility stream indicates a non-visible output primitive.

20. The apparatus of claim 16, wherein the rendering pipeline includes a geometry shader, and wherein the visibility stream has a length of N×M bits, wherein M is the maximum number of output primitives produced by the geometry shader, and wherein the binning pipeline further comprises a binning geometry shader configured to perform geometry shading on the plurality of output primitives after the binning domain shader.

21. An apparatus configured to perform tessellation in a tile-based graphics rendering pipeline comprising:
means for generating an input visibility stream for each tile of a frame before rendering the frame, the input visibility stream indicating whether or not an input primitive is visible in each tile when rendered; and
means for generating an output visibility stream for each tile of the frame before rendering the frame, the output visibility stream including an indication of whether or not an output primitive is visible in the tile based on a depth test, wherein the output primitive is determined to be visible if any pixel produced by rasterizing the output primitive is determined to be visible, and wherein the output visibility stream comprises a series of bits that indicate for every output primitive whether it contributes to the rendered tile or not and the input visibility stream comprises a series of bits that indicate for every input primitive whether it contributes to the rendered tile or not; and
means for tessellating the input primitives to create the output primitives for a current tile based on the input visibility stream and the output visibility stream, wherein the means for tessellating the input primitives comprises:
means for skipping tessellation for the input primitives indicated by the input visibility stream as not contributing to the current tile; and
means for performing tessellation, based on the output visibility stream, for input primitives indicated by the input visibility stream as contributing to the current tile, wherein tessellation is skipped for a portion of the input primitives for which corresponding output primitives are indicated as not contributing to the current tile by the output visibility stream.

22. The apparatus of claim 21, wherein means for generating the input visibility stream comprises:
means for vertex shading the input primitive;
means for hull shading the vertex shaded input primitive;
means for tessellating the hull shaded input primitive to produce a plurality of output primitives;
means for domain shading the plurality of output primitives;
means for rasterizing the plurality of output primitives to produce pixels;
means for performing a depth test on the pixels to determine if the pixels are visible for a tile of a frame; and
means for generating an indication in the input visibility stream of whether or not the input primitive is visible in the tile based on the depth test, wherein the input primitive is determined to be visible if any of the pixels produced by rasterizing the output primitives associated with the input primitive are determined to be visible.

23. The apparatus of claim 21, wherein the input primitive is a patch and wherein the output primitive is a triangle, quad or isoline.

24. The apparatus of claim 21, further comprising:
means for rendering the current tile of the frame, wherein rendering is skipped for input primitives indicated as being non-visible in the current tile by the input visibility stream.

25. The apparatus of claim 21, further comprising:
means for rendering the current tile of the frame, wherein rendering is skipped for output primitives indicated as being non-visible in the current tile by the output visibility stream.

26. An apparatus configured to perform tessellation in a tile-based rendering pipeline comprising:
means for generating a visibility stream for each input primitive for each tile of a frame before rendering the frame, the visibility stream including an indication of whether or not an output primitive is visible in the tile based on a depth test, wherein the output primitive is determined to be visible if any pixel produced by rasterizing the output primitive is determined to be visible, the visibility stream having a length of N bits, wherein each bit indicates whether or not a respective output primitive is visible in each tile when rendered, and wherein the output primitive is produced by tessellating the input primitive;
means for tessellating the input primitives to create the output primitives for a current tile based on the visibility stream wherein tessellating the input primitives comprises skipping tessellation for a portion of the input primitives where corresponding output primitives are indicated as not contributing to the current tile by the visibility stream; and
means for rendering the current tile of the frame, wherein rendering is skipped for input primitives in the case that every bit in the visibility stream indicates a non-visible output primitive.

27. The apparatus of claim 26, wherein the length N is determined by the maximum number of output primitives per input primitive as defined by a rendering pipeline.

28. The apparatus of claim 26, wherein means for generating a visibility stream comprises:
means for vertex shading the input primitive;
means for hull shading the vertex shaded input primitive;
means for tessellating the hull shaded input primitive to produce a plurality of output primitives;
means for domain shading the plurality of output primitives;
means for rasterizing the plurality of output primitives to produce pixels;
means for performing a depth test on the pixels to determine if the pixels are visible for a tile of a frame; and
means for generating the indication in the visibility stream of whether or not the output primitive is visible in the tile based on the depth test, wherein the output primitive is determined to be visible if any pixel produced by rasterizing the output primitive is determined to be visible.

29. The apparatus of claim 26, further comprising:
means for rendering the current tile of the frame, wherein rendering is skipped for output primitives indicated as being non-visible in the current tile by the visibility stream.

30. The apparatus of claim 26, wherein the tile-based rendering architecture has an enabled geometry shader, and wherein the visibility stream has a length of N×M bits, wherein M is the maximum number of output primitives produced by the geometry shader, and wherein means for generating a visibility stream further comprises means for geometry shading the plurality of output primitives after the means for domain shading the output primitives.

31. A non-transitory computer-readable storage medium storing instructions that, when executed, cause one or more processors of a device for performing tessellation in a tile-based graphics rendering pipeline to:
generate an input visibility stream for each tile of a frame before rendering the frame, the input visibility stream indicating whether or not an input primitive is visible in each tile when rendered,
generate an output visibility stream for each tile of the frame before rendering the frame, the output visibility stream including an indication of whether or not an output primitive is visible in the tile based on a depth test, wherein the output primitive is determined to be visible if any pixel produced by rasterizing the output primitive is determined to be visible, and wherein the output visibility stream comprises a series of bits that indicate for every output primitive whether it contributes to the rendered tile or not and the input visibility stream comprises a series of bits that indicate for every input primitive whether it contributes to the rendered tile or not, and
tessellate the input primitives to create the output primitives for a current tile based on the input visibility stream and the output visibility stream, wherein tessellating the input primitives comprises:
skipping tessellation for the input primitives indicated by the input visibility stream as not contributing to the current tile; and
performing tessellation, based on the output visibility stream, for input primitives indicated by the input visibility stream as contributing to the current tile, wherein tessellation is skipped for a portion of the input primitives for which corresponding output primitives are indicated as not contributing to the current tile by the output visibility stream.

32. The non-transitory computer-readable medium of claim 31, further causing the one or more processors to:
perform vertex shading on the input primitive;
perform hull shading the vertex shaded input primitive;
tessellate the hull shaded input primitive to produce a plurality of output primitives;
perform domain shading the plurality of output primitives;
rasterize the plurality of output primitives to produce pixels;
perform a depth test on the pixels to determine if the pixels are visible for a tile of a frame;
generate an indication in the input visibility stream of whether or not the input primitive is visible in the tile based on the depth test, wherein the input primitive is determined to be visible if any of the pixels produced by rasterizing the output primitives associated with the input primitive are determined to be visible.

33. The non-transitory computer-readable medium of claim 31, wherein the input primitive is a patch and wherein the output primitive is a triangle, quad or isoline.

34. The non-transitory computer-readable medium of claim 31, further causing the one or more processors to:
render the current tile of the frame, wherein rendering is skipped for input primitives indicated as being non-visible in the current frame by the input visibility stream, and wherein rendering is skipped for output primitives indicated as being non-visible in the current frame by the output visibility stream.

35. A non-transitory computer-readable storage medium storing instructions that, when executed, cause one or more processors of a device for performing tessellation in a tile-based graphics rendering pipeline to:
generate a visibility stream for each input primitive for each tile of a frame before rendering the frame, the visibility stream including an indication of whether or not an output primitive is visible in the tile based on a depth test, wherein the output primitive is determined to be visible if any pixel produced by rasterizing the output primitive is determined to be visible, the visibility stream having a length of N bits, wherein each bit indicates whether or not a respective output primitive is visible in each tile when rendered, and wherein the output primitive is produced by tessellating the input primitive;
tessellate the input primitives to create the output primitives for a current tile based on the visibility stream wherein tessellating the input primitives comprises skipping tessellation for a portion of the input primitives where corresponding output primitives are indicated as not contributing to the current tile by the visibility stream.

36. The non-transitory computer-readable medium of claim 35, wherein the length N is determined by the maximum number of output primitives per input primitive as defined by a rendering pipeline.

37. The non-transitory computer-readable medium of claim 35, further causing the one or more processors to:
perform vertex shading on the input primitive;
perform hull shading the vertex shaded input primitive;
tessellate the hull shaded input primitive to produce a plurality of output primitives;
perform domain shading the plurality of output primitives;
rasterize the plurality of output primitives to produce pixels;
perform a depth test on the pixels to determine if the pixels are visible for a tile of a frame; and
generate the indication in the visibility stream of whether or not the output primitive is visible in the tile based on the depth test, wherein the output primitive is determined to be visible if any pixel produced by rasterizing the output primitive is determined to be visible.

38. The non-transitory computer-readable medium of claim 35, further causing the one or more processors to:
render the current tile of the frame, wherein rendering is skipped for input primitives in the case that every bit in the visibility stream indicates a non-visible output primitive.

39. The non-transitory computer-readable medium of claim 38, wherein rendering is skipped for output primitives indicated as being non-visible in the current tile by the visibility stream.

40. The non-transitory computer-readable medium of claim 35, wherein the instructions further cause the one or more processors to execute a rendering pipeline which includes a geometry shader, and wherein the visibility stream has a length of N×M bits, wherein M is the maximum number of output primitives produced by the geometry shader, and wherein the instructions further cause a processor to perform geometry shading on the plurality of output primitives after performing domain shading.

* * * * *